UNITED STATES PATENT OFFICE.

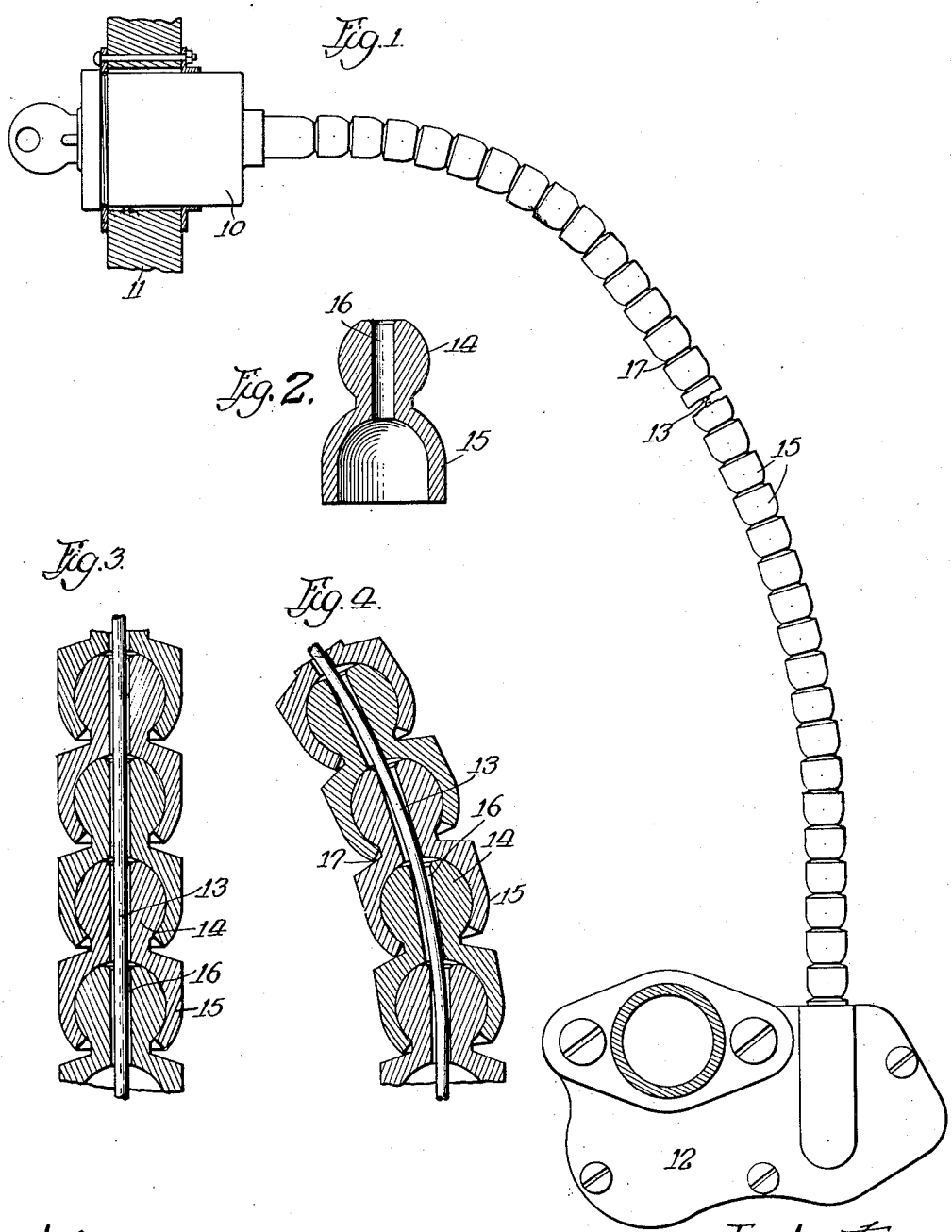

THEODORE C. RIEBE, OF CHICAGO, ILLINOIS, ASSIGNOR TO ROGERS MOTOR LOCK COMPANY, OF CHICAGO, ILLINOIS, A CORPORATION OF ILLINOIS.

FLEXIBLE ARMORED CONDUIT.

1,276,117.        Specification of Letters Patent.     Patented Aug. 20, 1918.

Application filed June 13, 1917. Serial No. 174,467.

*To all whom it may concern:*

Be it known that I, THEODORE C. RIEBE, a citizen of the United States, and resident of Chicago, in the county of Cook and State of Illinois, have invented certain new and useful Improvements in Flexible Armored Conduits, of which the following is a specification.

My invention relates to automobile locking devices and particularly to a flexible conduit having novel features which adapt it for use in connection with the constructions disclosed in my co-pending applications, Serial No. 174,466 and Serial No. 174,468 filed of even date herewith.

An object in the present invention is to produce a cable or housing for a valve-actuating wire, the device having the function in connection with its flexibility, of closely confining the wire to permit of the wire being forcibly moved longitudinally whereby to operate the valve by a push and pull movement.

Another object has been to so construct the flexible housing that any attempt at tampering with the same by violence would serve to lock the valve. In order to secure this result it was essential that the conduit should not be extensible. In many if not all the armored cables a rotation or longitudinal pull thereon affects the lineal dimension thereof and this objection prevents the use of such cables where absolute certainty as to the integrity of the lock is required.

In the present invention the conductor is formed from a plurality of connected units, each unit having an axial opening and being composed of a ball and socket. In assembling the units the ball of one unit is accommodated within the socket of an adjacent unit and the socket then compressed or crimped firmly onto the ball. Thus unlimited relative rotation and limited flexibility or angular movement is permitted without changing in the least the lineal dimension.

The invention will be more readily understood by reference to the accompanying drawing, wherein, Figure 1 is a side elevation showing the use to which the cable is put;

Fig. 2 is an enlarged sectional view through one of the housing units before the units are assembled;

Fig. 3 is a sectional view showing the assembling of the conduit, and,

Fig. 4 is a similar view showing the extent of angular movement permitted.

In the drawings a lock similar to that shown in my co-pending application referred to is indicated at 10, the same being mounted on the dash 11, of the vehicle to be locked. The valve member which acts to lock the parts is indicated at 12, and is intended to be located at a point in the engine intake manifold. A wire 13, operatively connects the lock 10, to the valve 12, the wire being contained within a housing or flexible armored conduit such as contemplated by me.

The conduit is composed of duplicate sections or units, one of which is shown in Fig. 2, in its condition prior to being assembled. The units comprise a ball portion 14, and a socket portion 15. An axial opening 16, is provided through the ball portion. The units are assembled as shown in Fig. 3, by placing the ball of one section within the socket of the other section, then crimping or compressing the margin of the socket portion around the ball. The conduit will be formed of high carbon steel or suitably hardened to an extent which will obviate its being severed by a saw. If, however, it is severed by a pair of powerful hand shears, the mass or body of metal composing the cable will necessarily involve an elongation thereof as the shear blades pass transversely therethrough and before the blades reach the inclosed wire. This action will cause the permanent locking of the valve member, due to a novel feature contained in the valve shown in my co-pending application referred to.

The units are so designed that the edge portions, which I have lettered 17, in Fig. 4, contact with the adjacent surface before the units have been displaced sufficiently to bind the wire. This is clearly shown in Fig. 4. Inasmuch as the peripheral edge 17, is continuous; that is, in the form of a ring, and as the abutment formed by the adjacent portion of the coöperating unit is likewise in the form of a ring surface, the sections may move to the same extent in any direction and to be stopped at the same point irrespective of the manner in which the cable is twisted or bent.

Referring to a single section, it will be noted that the ball and socket portions are very close to each other; that is, the circle outlining the ball portion comes in close proximity to the circle which outlines the socket portion; furthermore, that the apertures through the sections are of such size relative to the wire that when the conduit is deflected, as shown in Fig. 4, the wire or rod therein is curved in the true arc of a circle. If considerable space intervenes between the ball and socket portions it will be seen that the wire will be bent at separated points. In other words, that there will be a bent portion; then a straight portion; then a bent portion, etc., and that when it is attempted to reciprocate the rod longitudinally within the conduit, the wire must be deflected at as many points in its length as there are sections in the flexible conduit. If the wire employed has considerable strength or stiffness, as it has in the use to which it is shown herein, it would be utterly impossible to reciprocate it. Thus by locating the ball and socket sections in close proximity to each other whereby the circles of the ball sections come close to or intersect the circles of the socket sections, the wire is permitted to bend in a true arc of a circle.

Preferably the opening 16, is flared somewhat at the point of entrance, as shown in Fig. 2, to avoid sharp edges which might abrade the wire.

The exact form of the parts is not essential to the construction of a satisfactory device. Therefore modifications may be made without departure from the spirit of my invention.

I claim:

1. A flexible conduit composed of ball and socket sections each having a longitudinal, axial opening therethrough the sections being permanently united by crimping the metal constituting the socket around the ball portion of an adjacent section, the sections being so formed that a wire or rod contained within the longitudinal opening formed by the connected sections may bend in substantially the arc of a circle without longitudinal separation of the connected sections, substantially as described.

2. A flexible conduit for a longitudinally movable rod, said conduit being composed of connected ball and socket sections, the sections being so united as to prevent longitudinal separation of the adjacent sections unless by distortion of metal, each section being free to rotate on the section to which it is connected, substantially as described.

3. A flexible conduit for a longitudinally moving rod, said conduit being composed of sections, each section being formed by ball and socket portions, the edges of the circles defining the ball and socket portions being in relatively close proximity, substantially as described.

4. A flexible conduit for a rod or wire, said conduit being composed of permanently joined ball and socket sections, each having a longitudinal opening therethrough of a size slightly greater than that of the rod to be accommodated therein, the ball and socket portions being located in such relatively close proximity to each other and the opening through the adjacent sections being of such size relative to the rod that when the conduit is bent the rod contained therein will likewise be bent in the arc of a regular circle, substantially as described.

Signed at Chicago, Illinois, this 9th day of June, 1917.

THEODORE C. RIEBE.

Witness:
T. D. BUTLER.